(12) United States Patent
Tang et al.

(10) Patent No.: US 9,979,525 B2
(45) Date of Patent: May 22, 2018

(54) METHOD FOR FEEDING BACK ACKNOWLEDGE/ NON-ACKNOWLEDGE, USER EQUIPMENT AND SYSTEM

(71) Applicant: HUAWEI TECHNOLOGIES CO., LTD., Shenzhen, Guangdong (CN)

(72) Inventors: Zhenfei Tang, Shenzhen (CN); Fan Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 323 days.

(21) Appl. No.: 14/672,751

(22) Filed: Mar. 30, 2015

(65) Prior Publication Data
US 2015/0207607 A1 Jul. 23, 2015

Related U.S. Application Data

(63) Continuation of application No. PCT/CN2012/082401, filed on Sep. 28, 2012.

(51) Int. Cl.
*H04L 1/18* (2006.01)
*H04L 5/00* (2006.01)
*H04W 72/04* (2009.01)

(52) U.S. Cl.
CPC .......... *H04L 5/0055* (2013.01); *H04L 1/1861* (2013.01); *H04W 72/0413* (2013.01); *H04L 5/0007* (2013.01)

(58) Field of Classification Search
CPC ... H04L 5/0055; H04L 1/1861; H04L 5/0007; H04W 72/0413
See application file for complete search history.

(56) References Cited

U.S. PATENT DOCUMENTS

| 2009/0109912 | A1 | 4/2009 | Digirolamo et al. |
| 2010/0271970 | A1* | 10/2010 | Pan ........... H04L 1/0026 370/252 |
| 2011/0261679 | A1 | 10/2011 | Li et al. |
| 2012/0044890 | A1* | 2/2012 | Jen ........... H04L 1/18 370/329 |
| 2012/0155337 | A1 | 6/2012 | Park |
| 2012/0195292 | A1* | 8/2012 | Ko ........... H04L 1/0027 370/336 |

(Continued)

FOREIGN PATENT DOCUMENTS

| CN | 101043709 A | 9/2007 |
| CN | 101431774 A | 5/2009 |

(Continued)

*Primary Examiner* — Hashim Bhatti
(74) *Attorney, Agent, or Firm* — Leydig, Voit & Mayer, Ltd.

(57) ABSTRACT

A method for feeding back acknowledge/non-acknowledge, user equipment (UE) and system are provided, allowing downlink data of different networks to obtain correct feedback, and improving reliability of data transmission. The method includes: a UE receiving ACK/NACK resource configuration information delivered by a network node; determining the ACK/NACK resource according to the configuration information, the ACK/NACK resource being a time frequency resource used for bearing ACK/NACK on an uplink channel; and using the ACK/NACK resource to feed back ACK/NACK to the network node. The method is mainly used in the ACK/NACK feedback process.

9 Claims, 4 Drawing Sheets

(56) References Cited

U.S. PATENT DOCUMENTS

| | | | |
|---|---|---|---|
| 2012/0207059 A1 | 8/2012 | Lin et al. | |
| 2012/0207107 A1 | 8/2012 | Li et al. | |
| 2012/0210187 A1* | 8/2012 | Yin | H03M 13/136 |
| | | | 714/751 |
| 2014/0119249 A1* | 5/2014 | Park | H04L 1/1692 |
| | | | 370/280 |
| 2015/0207607 A1* | 7/2015 | Tang | H04L 1/1861 |
| | | | 370/330 |

FOREIGN PATENT DOCUMENTS

| | | |
|---|---|---|
| CN | 101577941 A | 11/2009 |
| CN | 101616486 A | 12/2009 |
| CN | 101855936 A | 10/2010 |
| CN | 102014496 A | 4/2011 |
| WO | WO 2012049947 A1 | 4/2012 |
| WO | WO 2012050389 A1 | 4/2012 |
| WO | WO 2012118356 A2 | 9/2012 |

\* cited by examiner

METHOD FOR FEEDING BACK ACKNOWLEDGE/ NON-ACKNOWLEDGE, USER EQUIPMENT AND SYSTEM

CROSS-REFERENCE TO RELATED APPLICATIONS

This application is a continuation of International Patent Application No. PCT/CN2012/082401, filed on Sep. 28, 2012, which is hereby incorporated by reference in its entirety.

FIELD

The application relates to the field of communication technology, in particular to a method for feeding back acknowledge/non-acknowledge (ACK/NACK), user equipment and a system.

BACKGROUND

3rd generation partnership project (3GPP) protocol system includes long term evolution (LTE) standards and universal mobile telecommunications system (UMTS) standards. Since an initial version of UMTS is prior to an initial version of LTE, compared with LTE network, the UMTS network has a broad coverage and user equipment (UE) supporting the UMTS network has a great penetration in early stage of LTE network deployment. Therefore, in a common network cabling manner, the UMTS network covers a wide range and the LTE network is adapted to cover hotspots.

In conventional technology, when an operator provides coverage of both the UMTS network and the LTE network for UE, carriers in UMTS and carriers in LTE are aggregated, i.e., data transmission between a network node and the UE may be performed in a UMTS mode or a LTE mode. To improve a transmission speed of downlink data, the UE may support downlink transmission in two modes. To save transmission costs of the UE and the network node, the UE may only need to implement uplink transmission technology in one mode, while the network node only needs to implement uplink receiving technology in one mode.

However, a method of feeding back ACK/NACK is still used when each downlink transmission mode has a corresponding uplink transmission channel. That is, after receiving downlink data of the LTE network, the UE feeds back ACK/NACK corresponding to the downlink data in an uplink resource of the LTE network; or after receiving downlink data of the UMTS network, the UE feeds back the ACK/NACK corresponding to the downlink data in an uplink resource of the UMTS network.

Therefore, when the UE can receive both the downlink data of the LTE network and the downlink data of the UMTS network, but only supports UMTS uplink or LTE uplink, a problem for transmitting ACK/NACK in one network mode through an uplink resource of another network mode is needed to be solved.

SUMMARY

A method of feeding back ACK/NACK, a user equipment and a system are provided according to embodiments of the application, so as to obtain a correct feedback for downlink data in different network modes, and improve data transmission reliability.

To implement foregoing purpose, technical solutions in the following are applied according to the embodiments of the application.

In one aspect of the application, a method for feeding back ACK/NACK is provided. The method includes:
receiving, by user equipment UE, configuration information of an ACK/NACK resource, where the configuration information is sent by a network node;
determining, by the UE, the ACK/NACK resource according to the configuration information, where the ACK/NACK resource is a time frequency resource adapted to carry the ACK/NACK in an uplink channel; and
feeding back, by the UE, the ACK/NACK to the network node in the ACK/NACK resource.

In an implementation scenario of the application, the determining, by the UE, the ACK/NACK resource according to the configuration information includes:
determining, from the time frequency resource of the uplink channel, at least one time frequency resource as a resource to be selected, according to the configuration information;
acquiring an auxiliary indication; and determining the ACK/NACK resource from the resources to be selected, according to the auxiliary indication, where the auxiliary indication includes any one of a channel number of a high speed shared control channel HS-SCCH, transmission power control TPC domain information of a dedicated physical control channel DPCCH, TPC domain information of F-DPCH, information carried in a control channel, information carried in a custom channel, TPC domain information of certain downlink control information DCI in physical downlink control channel PDCCH/enhanced-physical downlink control channel E-PDCCH, information of a carrier indication field CIF of PDCCH/E-PDCCH, or a radio network temporary identifier RNTI.

In another implementation scenario of the application, the auxiliary indication is carried in a high speed packet access (High Speed Packet Access, HSPA) signaling or a long term evolution LTE signaling.

In another implementation scenario of the application, the feeding back, by the UE, the ACK/NACK to the network node in the ACK/NACK resource includes:
encoding, by the UE, the ACK/NACK in PUCCH format 1a/1b, PUCCH format 1b with channel selection or PUCCH format 3; and
carrying, by the UE, the encoded ACK/NACK into the ACK/NACK resource; and feeding back the encoded ACK/NACK to the network node.

In another implementation scenario of the application, the encoding, by the UE, the ACK/NACK in PUCCH format 1a/1b, PUCCH format 1b with channel selection or PUCCH format 3 includes:
when downlink data corresponding to the ACK/NACK is received in a LTE carrier, encoding, by the UE, the ACK/NACK in PUCCH format 1a/1b, PUCCH format 1b with the channel selection or PUCCH format 3; and
when the downlink data corresponding to the ACK/NACK is received in a UMTS carrier, encoding, by the UE, the ACK/NACK in PUCCH format 3.

In another implementation scenario of the application, the PUCCH format 3 is reed-muller RM code or dual-reed muller dual-RM code.

In another aspect of the application, a method for feeding back ACK/NACK is provided. The method includes:

allocating, by a network node, an ACK/NACK resource for user equipment UE, where the ACK/NACK resource is a time frequency resource adapted to carry the ACK/NACK in an uplink channel;

transmitting, by the network node, configuration information of the ACK/NACK resource to the UE, where the UE feeds back the ACK/NACK to the network node in the ACK/NACK resource; and receiving, by the network node, the ACK/NACK fed back by the UE.

In another implementation scenario of the application, the transmitting, by the network node, configuration information to the UE includes:

transmitting the configuration information to the UE, where the UE determines at least one time frequency resource as a resource to be selected, from the time frequency resource of the uplink channel.

transmitting an auxiliary indication to the UE, where the UE determines the ACK/NACK resource from the resources to be selected, according to the auxiliary indication, and where the auxiliary indication includes any one of a channel number of a high speed shared control channel HS-SCCH, transmission power control TPC domain information of a dedicated physical control channel DPCCH, TPC domain information of F-DPCH, information carried in a control channel, information carried in a custom channel, TPC domain information of certain downlink control information DCI in physical downlink control channel/enhanced-physical downlink control channel PDCCH/E-PDCCH, information of a carrier indication field CIF of PDCCH/E-PDCCH, or a radio network temporary identifier RNTI.

In another implementation scenario of the application, the auxiliary indication is carried in a high speed packet access HSPA signaling or a long term evolution LTE signaling.

In another implementation scenario of the application, the receiving, by the network node, the ACK/NACK fed back by the UE includes:

receiving, by the network node, encoded ACK/NACK, where the encoded ACK/NACK is carried in the ACK/NACK resource fed back by the UE, and where the ACK/NACK is encoded in PUCCH format 1a/1b, PUCCH format 1b with channel selection or PUCCH format 3.

In another implementation scenario of the application, when downlink data corresponding to the ACK/NACK is transmitted in a LTE carrier, the ACK/NACK is encoded in PUCCH format 1a/1b, PUCCH format 1b with channel selection or PUCCH format 3; and when the downlink data corresponding to the ACK/NACK is transmitted in a UMTS carrier, the ACK/NACK is encoded in PUCCH format 3.

In another implementation scenario of the application, the PUCCH format 3 is reed-muller RM code or dual-reed muller dual-RM code.

In another aspect of the application, a user equipment UE is provided, which includes:

a receiving unit, adapted to receive configuration information of an ACK/NACK resource, where the configuration information is sent by a network node;

a determining unit, adapted to determine the ACK/NACK resource according to the configuration information, where the ACK/NACK resource is a time frequency resource adapted to carry the ACK/NACK in an uplink channel; and a feedback unit, adapted to feed back the ACK/NACK to the network node in the ACK/NACK resource determined by the determining unit.

In an implementation scenario of the application, the determining unit includes:

a first determining module, adapted to determine, from the time frequency resource of the uplink channel, at least one time frequency resource as a resource to be selected, according to the configuration information received by the receiving unit;

a second determining module, adapted to acquire a transmission parameter of a control channel as an auxiliary indication; and determine the ACK/NACK resource from the resources to be selected, according to the auxiliary indication, where the auxiliary indication includes any one of a channel number of a high speed shared control channel HS-SCCH, transmission power control TPC domain information of a dedicated physical control channel DPCCH, TPC domain information of F-DPCH, information carried in a control channel, information carried in a custom channel, TPC domain information of certain downlink control information DCI in physical downlink control channel/enhanced-physical downlink control channel PDCCH/E-PDCCH, information of a carrier indication field CIF of PDCCH/E-PDCCH, or a radio network temporary identifier RNTI.

In another implementation scenario of the application, the auxiliary indication is carried in a high speed packet access HSPA signaling or a long term evolution LTE signaling.

In another implementation scenario of the application, the feedback unit includes:

an encoding module, adapted to encode the ACK/NACK in PUCCH format 1a/1b, PUCCH format 1b with channel selection or PUCCH format 3; and a feedback module, adapted to carry the ACK/NACK encoded by the encoding module into the ACK/NACK resource, and feed back the encoded ACK/NACK to the network node.

In another implementation scenario of the application, the encoding module includes:

a first submodule, adapted to encode the ACK/NACK in PUCCH format 1a/1b, PUCCH format 1b with the channel selection or PUCCH format 3, when the downlink data corresponding to the ACK/NACK is received in a LTE carrier; and a second submodule, adapted to encode the ACK/NACK in PUCCH format 3, when the downlink data corresponding to the ACK/NACK is received in a UMTS carrier.

In another implementation scenario of the application, the PUCCH format 3 is reed-muller RM code or dual-reed muller dual-RM code.

In another aspect of the application, a network node is provided, which includes:

an allocation unit, adapted to allocate an ACK/NACK resource for user equipment UE, where the ACK/NACK resource is a time frequency resource adapted to carry ACK/NACK in an uplink channel;

a transmitting unit, adapted to transmit configuration information of the ACK/NACK resource to the UE, where the UE feeds back the ACK/NACK to the network node in the ACK/NACK resource; and a receiving unit, adapted to receive the ACK/NACK fed back by the UE, in the ACK/NACK resource.

In an implementation scenario of the application, the transmitting unit includes:

a first transmitting module, adapted to transmit the configuration information to the UE, where the UE determines at least one time frequency resource as a resource to be selected, from the time frequency resource of the uplink channel.

a second transmitting module, adapted to transmit auxiliary indication to the UE, where the UE determines the ACK/NACK resource from the resources to be selected, according to the auxiliary indication, and where the auxiliary indication includes any one of a channel number of a high speed shared control channel HS-SCCH, transmission power control TPC domain information of a dedicated physical control channel DPCCH, TPC domain information of F-DPCH, information carried in a control channel, information carried in a custom channel, TPC domain information of certain downlink control information DCI in physical downlink control channel PDCCH/enhanced-physical downlink control channel E-PDCCH, information of a carrier indication field CIF of PDCCH/E-PDCCH, or a radio network temporary identifier RNTI.

In another implementation scenario of the application, the auxiliary indication is carried in a high speed packet access HSPA signaling or a long term evolution LTE signaling.

In another implementation scenario of the application, the receiving unit is further adapted to receive encoded ACK/NACK carried in the ACK/NACK resource, where the ACK/NACK is encoded in PUCCH format 1a/1b, PUCCH format 1b with channel selection, or PUCCH format 3.

In another implementation scenario of the application, when downlink data corresponding to the ACK/NACK is transmitted in a LTE carrier, the ACK/NACK is encoded in PUCCH format 1a/1b, PUCCH format 1b with channel selection, or PUCCH format 3.

When the downlink data corresponding to the ACK/NACK is transmitted in a UMTS carrier, the ACK/NACK is encoded in PUCCH format 3.

In another implementation scenario of the application, the PUCCH format 3 is a reed-muller RM code or a dual-reed muller dual-RM code.

In another aspect of the application, a system for feeding back ACK/NACK is provided, which includes user equipment UE and a network node, The UE is adapted to receive configuration information of an ACK/NACK resource, where the configuration information is sent by the network node; determine the ACK/NACK resource according to the configuration information, where the ACK/NACK resource is a time frequency resource adapted to carry the ACK/NACK in an uplink channel; and feed back the ACK/NACK to the network node in the ACK/NACK resource; and the network node is adapted to allocate the ACK/NACK resource for the user equipment UE; transmit the configuration information of the ACK/NACK resource to the UE, where the UE feeds back the ACK/NACK to the network node in the ACK/NACK resource; and receive the ACK/NACK fed beck by the UE, in the ACK/NACK resource.

According to the method for feeding back ACK/NACK, the UE, the network node and the system provided according to embodiments of the application, the network side allocates the ACK/NACK resource for the UE, and thus the UE may feed back the ACK/NACK in the ACK/NACK resource. In the conventional technology, when the UE supports downlink transmission of more than two networks and uplink transmission of only one network, the UE can only feed back ACK/NACK of downlink data which is sent via the network supporting the uplink transmission. Therefore, compared with the conventional technology, the UE may perform a feedback for downlink data sent via different networks, in the ACK/NACK resource allocated by the network side. In this way, the downlink data of different networks may be fed back correctly, and reliability for data transmission may be improved.

BRIEF DESCRIPTION OF THE DRAWINGS

To describe the technical solutions for embodiments of the present application or technical solution in conventional technology more clearly, the following briefly describes the drawings involved in the embodiments of the present application or in the conventional technology. Apparently, the drawings described below are some embodiments, and persons of ordinary skill in the art can derive other drawings according to the drawings without any creative effort.

DETAILED DESCRIPTION

Technical solutions of the embodiments of the present application will be illustrated completely and clearly with the following drawings of the embodiments of the application. Apparently, the described embodiments are merely a few rather than all of the embodiments of the present application. All other embodiments obtained by persons of ordinary skill in the art are based on the embodiments of the present application without creative efforts shall fall within the scope of the present application.

First Embodiment

Figure 1:
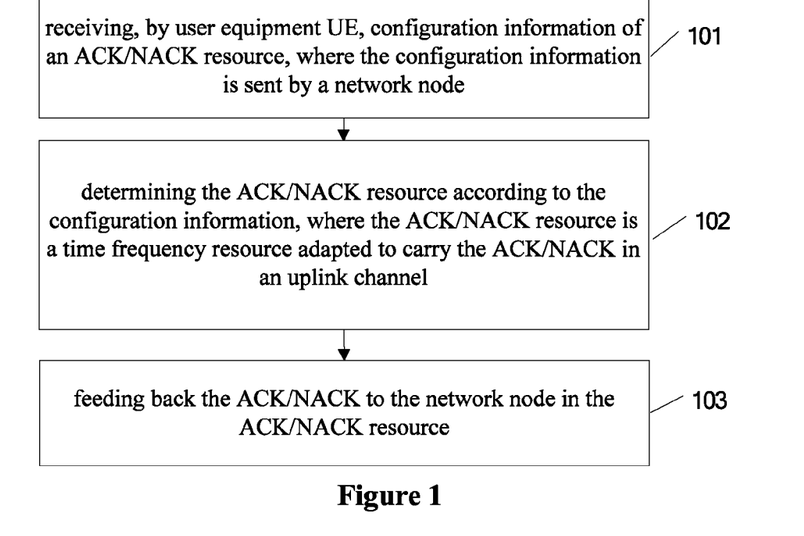
FIG. 1 is a flow chart of a method for feeding back ACK/NACK according to a first embodiment of the application.

A method for feeding back ACK/NACK is provided according to the embodiment of the application, which is applicable to a UE side. As shown in FIG. 1, the method may include:

101 includes: receiving, by the UE, configuration information of an ACK/NACK resource, where the configuration information is sent by a network node.

After receiving downlink data through a UMTS network or a LTE network, the UE usually may feed back the ACK/NACK corresponding to the downlink data to the network side, to inform a network node whether the downlink data is correctly received. Before the ACK/NACK is fed back, the ACK/NACK may be carried in the ACK/NACK resource allocated by network side, to be fed back to the network node, where the ACK/NACK resource is the time frequency resource adapted to carry the ACK/NACK in an uplink channel.

According to the embodiment, when carriers in two different modes, such as a carrier in LTE and a carrier in HSPA, are aggregated, with the method according to the embodiment of the application, the ACK/NACK resource may be allocated through high layer signaling, and the ACK/NACK is fed back in the ACK/NACK resource allocated through the high layer signaling.

102 includes: determining the ACK/NACK resource according to the configuration information, where the ACK/

NACK resource is a time frequency resource adapted to carry the ACK/NACK in an uplink channel.

The network node may be a base station or a core network device, which may issue the configuration information in a mode of a high layer signaling. The high layer signaling may be a HSPA signaling or a LTE signaling. For example, if the network node issues the configuration information of the ACK/NACK resource through the UMTS network, the high layer signaling may be the HSPA signaling. If the network node issues the configuration information of the ACK/NACK resource through the LTE network, the high layer signaling may be the LTE signaling.

Furthermore, the configuration information may determine a unique ACK/NACK resource, and thus the ACK/NACK resource may be used in step 103. The configuration information may also determine at least two resources to be selected. In this way, the UE may determine the unique ACK/NACK resource form the resources to be selected, and then the ACK/NACK resource is used in step 103.

103 includes: feeding back the ACK/NACK to the network node in the ACK/NACK resource.

The ACK/NACK may be encoded, and the encoded ACK/NACK is carried in the ACK/NACK resource to be fed back to the network node. The mode of encoding the ACK/NACK may include: PUCCH format 1a/1b (format 1a/1b), PUCCH format 1b with channel selection (format 1b with channel selection) or PUCCH format 3 (format 3). For example, downlink data is received through the UMTS network, and then PUCCH format 3 may be adapted to encode the ACK/NACK. Therefore, more bits of ACK/NACK may be carried, and thus the encoded ACK/NACK may be carried in the LTE carrier to be fed back to the network node.

Figure 2:
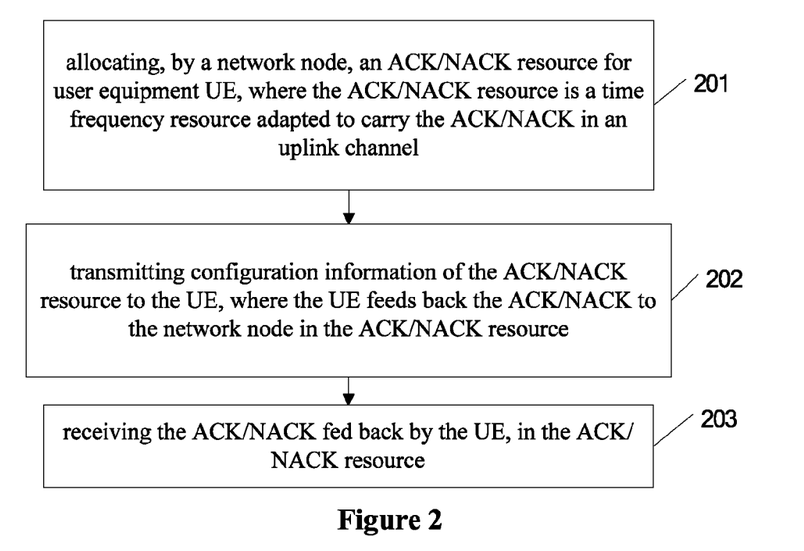
FIG. 2 is a flow chart of another method for feeding back the ACK/NACK according to the first embodiment of the application.

A method for feeding back ACK/NACK is provided according to an embodiment of the application, which is applicable to network side. As shown in FIG. 2, the method may include:

201 includes: allocating, by a network node, an ACK/NACK resource for user equipment UE, where the ACK/NACK resource is a time frequency resource adapted to carry the ACK/NACK in an uplink channel.

The network side may allocate a unique ACK/NACK resource to the UE. Alternatively, the network side may allocate to the UE at least one resource to be selected, through a high layer signaling; and assist the UE to determine the unique ACK/NACK resource from multiple resources to be selected, based on an auxiliary indication such as a physical layer signaling or other signaling.

202 includes: transmitting configuration information of the ACK/NACK resource to the UE, where the UE feeds back the ACK/NACK to the network node in the ACK/NACK resource.

203 includes: receiving the ACK/NACK fed back by the UE, in the ACK/NACK resource.

The network side may receive the ACK/NACK carried in the ACK/NACK resource. The ACK/NACK may be encoded in PUCCH format 1a/1b, PUCCH format 1b with channel selection, or PUCCH format 3. The ACK/NACK resource may be an uplink resource of a LTE network or an uplink resource of a UMTS network, which may be determined according to uplink network modes supported by network side and UE side, or according to an actual need. The ACK/NACK carried in the ACK/NACK resource may be a feedback for downlink data of the LTE network, or a feedback for downlink data of the UMTS network. Therefore, the ACK/NACK in different network modes are all correctly fed back.

In the method for feeding back ACK/NACK according to the embodiment of the application, the network side allocates the ACK/NACK resource for the UE, and thus the UE may feed back the ACK/NACK in the ACK/NACK resource. In conventional technology, when the UE supports downlink transmission of more than two networks and supports uplink transmission of only one network (such as a hybrid system with a high-speed packet access HSPA system and a LTE system), the UE can only feed back ACK/NACK of downlink data which is sent in the network supporting the uplink transmission. Therefore, compared with the conventional technology, the UE may perform a feedback for downlink data sent on different networks, in the ACK/NACK resource allocated by the network side. In this way, the downlink data of different networks may be fed back correctly, and reliability for data transmission may be improved.

Second Embodiment

Figure 3:
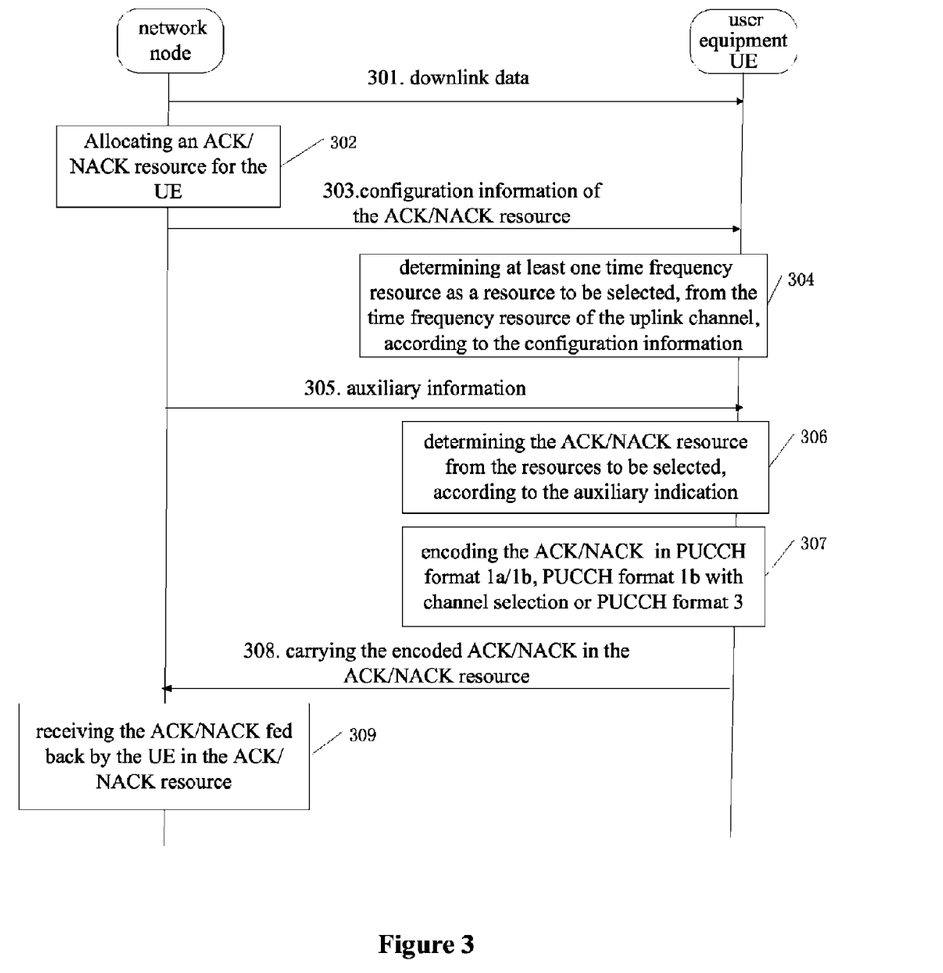
FIG. 3 is a flow chart of a method for feeding back ACK/NACK according to a second embodiment of the application.

A method for feeding back ACK/NACK is provided according the embodiment of the application. As shown in FIG. 3, the method includes:

301 includes: transmitting, by a network node, downlink data to UE;

After receiving the downlink data sent by the network side, the UE usually may feed back ACK/NACK corresponding to the downlink data to the network side. Thus, the network side determines whether the downlink data is successfully transmitted or whether the downlink data needs to be retransmitted, by receiving the downlink data. The downlink data may be downlink data of the LTE network or downlink data of the UMTS network. If the network node and the UE support other mode networks, the downlink data may be downlink data of other networks.

According to the embodiment, after receiving the downlink data sent by the network node, the UE may feed back the ACK/NACK of the downlink data to the network node no matter what mode of a carrier the downlink data is received from. Therefore, the downlink data is downlink data to which the feedback response, and corresponds to the ACK/NACK.

302 includes: allocating, by the network node, an ACK/NACK resource for the UE.

The network node allocates the ACK/NACK resource for the downlink data and informs the UE of the ACK/NACK resource, and thus the UE may perform the feedback in the ACK/NACK resource no matter what network mode of downlink data is received by the UE.

303 includes: transmitting, by the network node, configuration information of the ACK/NACK resource to the UE.

After allocating the ACK/NACK resource for the UE, the network node may transmit the configuration information of the ACK/NACK resource to the UE through a high layer signaling. If the network node allocates a unique ACK/NACK resource for the UE, the UE may determine the ACK/NACK resource through the high layer signaling, and use the ACK/NACK resource for feedback. Alternatively, the network node may indicate to the UE at least one resource to be selected, through the high layer signaling, and the UE may randomly select one ACK/NACK resource from the resource to be selected. Alternatively, one ACK/NACK resource may be determined from the resource to be selected, through an auxiliary indication transmitted by the network node. Alternatively, one ACK/NACK resource may be determined from the resource to be selected, in other determination methods.

304 includes: determining, by the UE, at least one time frequency resource as resources to be selected, from a time frequency resource of an uplink channel according to the configuration information.

The resource to be selected may be an uplink resource of the LTE network, an uplink resource of the UMTS network, or an uplink resource of another network mode supported by the UE and the network node, which will not be limited according to the embodiment of the application.

Furthermore, after at least one resource to be selected is allocated for the UE through the high layer signaling, one ACK/NACK resource may be determined from the resources to be selected, through following steps.

305 includes: transmitting, by the network node, the auxiliary indication to the UE.

The auxiliary indication may be carried in a HSPA signaling. For example, the auxiliary indication may be a channel number of a high speed shared control channel (Shared Control Channel for HS-DSCH, HS-SCCH), transmission power control (TPC) domain information of a dedicated physical control channel (DPCCH), TPC domain information of a fractional dedicated physical control channel (F-DPCH), information carried in a control channel, information carried in a custom channel. Alternatively, the auxiliary indication may be carried in the LTE signal. For example, the auxiliary indication may be TPC domain information of certain downlink control information (DCI) in a dedicated physical downlink control channel/enhanced-dedicated physical control channel (PDCCH/E-PDCCH), carrier indication field (CIF) information of a PDCCH/E-PDCCH or a radio network temporary identifier (RNTI).

306 includes: determining, by the UE, the ACK/NACK resource from the resources to be selected, according to the auxiliary indication.

For example, it is assumed that 4 resources to be selected are determined through the high layer signaling in step 304. One of the 4 resources to be selected may be determined as the ACK/NACK resource through, but is not limited to, any one of following ways.

The auxiliary indication may be 2 bits of the HSPA signaling or the LTE signaling, which is adapted to describe one of the 4 resources to be selected, where the UE determines the resources to be selected, described by the auxiliary indication, to be the ACK/NACK resource. Only the 2 bits are taken as an example in the embodiment. The auxiliary indication may be 4 bits or other bits of signaling as long as the auxiliary indication may describe the resources to be selected, which will not be limited according to the embodiment of the application.

The auxiliary indication may be a channel number of a HS-SCCH. An ascending order of the code channel numbers correspond to an order of the resources to be selected. For example, the first channel number of the HS-SCCH corresponds to the first resource to be selected, the second channel number of the HS-SCCH corresponds to the second resource to be selected, and so on. When receiving a channel message on the HS-SCCH, the ACK/NACK resource may be determined according to the channel number occupied by the HS-SCCH.

The auxiliary indication may be carried in a DPCCH or an F-DPCH. For example, 2 bits of the TPC domain of the DPCCH are used as an auxiliary indication. "00" corresponds to the first resource to be selected, "01" corresponds to the second resource to be selected, and so on.

The auxiliary indication may be carried in a control channel. A present control channel is reused. For example, a channel structure which is the same as the F-DPCH, an F-TPICH, an E-HICH/E-RGCH or an E-AGCH is used. Each of the 4 resources to be selected is indicated by 2 bits of the auxiliary indication transmitted through the control channel.

The auxiliary indication may be carried in a custom channel. The custom channel may be acquired by extending or redefining the channel structure. 2 bits of the auxiliary indication are transmitted in the custom channel and are adapted to indicate each of 4 resources to be selected.

The auxiliary indication may be TPC domain information of the certain DCI in the PDCCH/E-PDCCH. 2 bits of the TPC domain of the certain DCI are adapted to indicate the ACK/NACK resource, and other bits of the TPC domain are reserved.

The auxiliary indication may be CIF information of the PDCCH/E-PDCCH. The CIF is adapted to indicate a LTE carrier, and 2 bits of rest information domains of DCI are used to indicate the ACK/NACK resource.

The auxiliary indication may also include an extended RNTI. A new RNTI is defined by acquiring the extended RNTI. The extended RNII may be adapted to indicate DCI for carrying the auxiliary indication, and thus the UE determines the ACK/NACK resource from the 4 resources to be selected, based on the 2 bits of the DCI.

Furthermore, the process of feeding back ACK/NACK in the ACK/NACK resource by the UE may includes following steps.

307 includes: encoding, by the UE, the ACK/NACK in PUCCH format 1a/1b, PUCCH format 1b with channel selection, or PUCCH format 3.

The encoding mode of the ACK/NACK may be determined by comprehensively considering factors such as a carrier of receiving downlink data, a number of the bits of the ACK/NACK, a number of the bits of the ACK/NACK resource, a carrier for carrying the ACK/NACK resource, etc. For example, if downlink data corresponding to the ACK/NACK is received from the LTE carrier, because the ACK/NACK feeding back only the LTE carrier includes few bits, the ACK/NACK may be encoded in PUCCH format 1a/1b, the PUCCH format 1b with channel selection, or PUCCH format 3. If the downlink data corresponding to the ACK/NACK is received from the UMTS carrier, because the ACK/NACK feeding back the LTE carrier includes lots of bits, more ACK/NACK needs to be carried in an uplink feedback signaling of the LTE network, and thus the ACK/NACK may be encoded in PUCCH format 3.

The PUCCH format 3 may be a reed-muller (RM) code. Alternatively, the PUCCH format 3 may also be a dual-reed-muller (dual-RM) code, to further increase bits for carrying the ACK/NACK. Data encoded in the dual-RM code occupies fewer bits than data encoded in the RM code. Thus, more ACK/NACK may be carried in the limited ACK/NACK resource.

308 includes: carrying, by the UE, the encoded ACK/NACK into the ACK/NACK resource to be fed back to the network node.

The encoded ACK/NACK may be carried in the ACK/NACK resource determined in step 306. For example, downlink data is received from the UMTS carrier, and the UE only supports LTE uplink transmission. In this case, the ACK/NACK resource determined in step 306 is uplink resource of the LTE network, the ACK/NACK corresponding to the downlink data may be encoded in the dual-RM code format 3, and the encoded ACK/NACK is carried in the uplink resource of the LTE network, to be fed back to the network node. In addition, when the downlink data is received from the LTE carrier, and the network node/UE supports UMTS uplink transmission, the feedback method is similar, which will be omitted in the embodiment.

Particularly, when the UE receives downlink data of the LTE network and downlink data of the UMTS at same time or nearly at same time, ACK/NACK corresponding to the LTE downlink data and ACK/NACK corresponding to the UMTS downlink data may be fed back at same time. A method for allocating the ACK/NACK resource is similar to that according to the embodiment of the application. The difference therebetween is that the encoding for the ACK/NACK should adapt to the limited ACK/NACK resource as much as possible, so as to carry more bits of the ACK/NACK in the limited ACK/NACK. Furthermore, when the LTE carrier and the UMTS carrier are aggregated, a mapping relationship between the ACK/NACK and a subcarrier may be similar to a mapping relationship between ACK/NACK and a subcarrier in LTE carrier aggregation. For example, a serial number of the LTE carrier is 0, a serial number of the UMTS carrier is 1, and subcarriers of the two different network modes are aggregated. A mapping relationship between ACK/NACK corresponding to the LTE carrier and the LTE carrier, and a mapping relationship between ACK/NACK corresponding to the UMTS carrier and the UMTS carrier may be equivalent to that in a conventional aggregation of two LTE carriers, which will be omitted in the embodiment of the application.

309 includes: receiving, by the network node, the ACK/NACK fed back by the UE, in the ACK/NACK resource.

The network node receives the ACK/NACK carried in the ACK/NACK resource. To carry more bits of the ACK/NACK in the limited ACK/NACK resource, the ACK/NACK may be encoded in PUCCH format 1a/1b, PUCCH format 1b with channel selection, or PUCCH format 3. Correspondingly, the network node is capable of decoding the ACK/NACK.

According to the embodiment, the ACK/NACK resource may be the uplink resource of the LTE network allocated in step 301, or the uplink resource of the UMTS network allocated in step 301. Therefore, the network node may receive the ACK/NACK through the uplink resource of the LTE network or the uplink resource of the UMTS network. The ACK/NACK received by the network node may be ACK/NACK corresponding to the downlink data of the LTE or ACK/NACK corresponding to the downlink data of the UMTS. The network node may also receive the ACK/NACK corresponding to the downlink data of the LTE and the ACK/NACK corresponding to the downlink data of the UMTS at same time. Whether the ACK/NACK is fed back in the uplink resource of the LTE or the uplink resource of the UMTS may be determined from an uplink network mode supported by the network and an uplink network mode supported by the UE.

It should be illustrated that specific description for some steps according to the embodiment may refer to corresponding content according to the first embodiment, which will be omitted herein.

In the method for feeding back ACK/NACK according to the embodiment of the application, the network side allocates the ACK/NACK resource for the UE, and thus the UE may feed back the ACK/NACK in the ACK/NACK resource. In the conventional technology, when the UE supports downlink transmission of more than two networks and supports uplink transmission of only one network, the UE can only feed back ACK/NACK of downlink data which is sent by the network supporting the uplink transmission. Therefore, compared with the conventional technology, the UE may perform a feedback for downlink data sent on different networks, in the ACK/NACK resource allocated by the network side. In this way, the downlink data of different networks may be fed back correctly, and reliability for data transmission may be improved.

Third Embodiment

Figure 4:
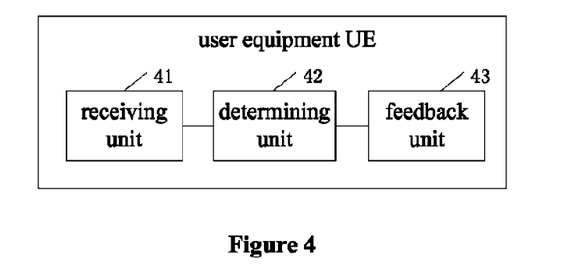
FIG. 4 is a schematic constitutional diagram of UE according to a third embodiment of the application.

UE is provided according to the embodiment of the application. As shown in FIG. 4, the UE includes a receiving unit 41, a determining unit 42 and a feedback unit 43.

The receiving unit 41 is adapted to receive configuration information of an ACK/NACK resource.

The determining unit 42 is adapted to determine the ACK/NACK resource according to the configuration information of the ACK/NACK, where the configuration information is received by the receiving unit 41.

The feedback unit 43 is adapted to feed back the ACK/NACK in the ACK/NACK resource determined by the determining unit 42.

Figure 5:
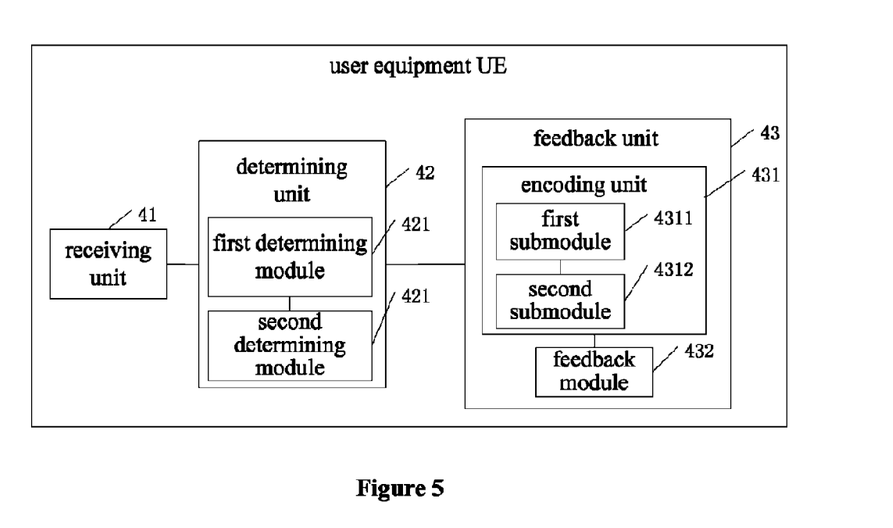
FIG. 5 is a schematic constitutional diagram of another UE according to the third embodiment of the application.

As shown in FIG. 5, the determining unit 42 further includes a first determining module 421 and a second determining module 422.

The first determining module 421 is adapted to determine, from the time frequency resource of the uplink channel, at least one time frequency resource as a resource to be selected, according to the configuration information received by the receiving unit 41;

The second determining module 422 is adapted to acquire auxiliary indication; and determine the ACK/NACK resource from the resource to be selected, according to the auxiliary indication, where the resource to be selected is determined by the first determining module.

According to the embodiment, the auxiliary indication may be carried in a high speed packet access HSPA signaling or a long term evolution LTE signaling. The auxiliary indication may include any one of a channel number of a high speed shared control channel HS-SCCH, transmission power control TPC domain information of a dedicated physical control channel DPCCH, TPC domain information of F-DPCH, information carried in a control channel, information carried in a custom channel, TPC domain information of certain downlink control information DCI in physical downlink control channel/enhanced-physical downlink control channel PDCCH/E-PDCCH, information of a carrier indication field CIF of PDCCH/E-PDCCH, or a radio network temporary identifier RNTI.

The feedback unit 43 further includes an encoding module 431 and a feedback module 432.

The encoding module 431 is adapted to encode the ACK/NACK in PUCCH format 1a/1b, PUCCH format 1b with channel selection, or PUCCH format 3.

The feedback module 432 is adapted to carry the ACK/NACK encoded by the encoding module 431 into the ACK/NACK resource to be fed back to the network node.

The encoding module 431 further includes a first submodule 4311 and a second submodule 4312.

The first submodule 4311 is adapted to encode the ACK/NACK in PUCCH format 1a/1b, PUCCH format 1b with channel selection, or PUCCH format 3, when downlink data corresponding to the ACK/NACK is received in a LTE carrier.

The second submodule 4312 is adapted to encode the ACK/NACK in PUCCH format 3, when downlink data corresponding to the ACK/NACK is received in a UMTS carrier.

The PUCCH format 3 is a reed-muller RM code or a dual-reed muller dual-RM code.

Figure 6:
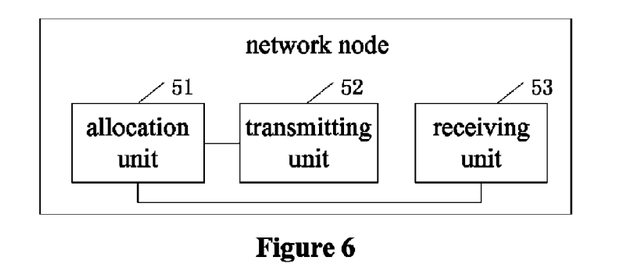
FIG. 6 is a schematic constitutional diagram of a network node according to the third embodiment of the application.

A network node is also provided according to an embodiment of the application. As shown in FIG. 6, the network node includes an allocation unit 51, a transmitting unit 52 and a receiving unit 53.

The allocation unit 51 is adapted to allocate an ACK/NACK resource for user equipment UE, where the ACK/NACK resource is a time frequency resource adapted to carry ACK/NACK in an uplink channel.

The transmitting unit 52 is adapted to transmit configuration information of the ACK/NACK resource to the UE, where the UE feeds back the ACK/NACK in the ACK/NACK resource.

The receiving unit 53 is adapted to receive the ACK/NACK fed back by the UE.

Figure 7:
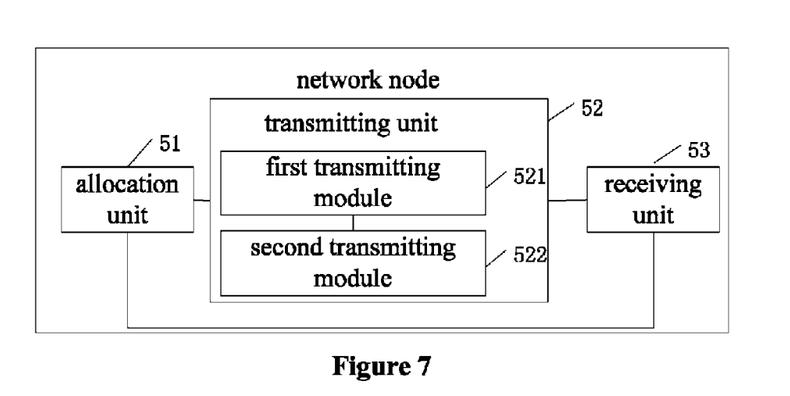
FIG. 7 is a schematic constitutional diagram of another network node according to the third embodiment of the application.

As shown in FIG. 7, the transmitting unit 22 further includes a first transmitting module 521 and a second transmitting module 522.

The first transmitting module 521 is adapted to transmit configuration information of the ACK/NACK to the UE, where the UE determines at least one time frequency resource as a resource to be selected, from the time frequency resource of the uplink channel.

The second transmitting module 522 is adapted to transmit auxiliary indication to the UE, where the UE determines the ACK/NACK resource from the resource to be selected, according to the auxiliary indication.

Furthermore, the auxiliary indication may be carried by a high speed packet access HSPA signaling or a long term evolution LTE signaling. The auxiliary indication may include any one of a channel number of a high speed shared control channel HS-SCCH, transmission power control TPC domain information of a dedicated physical control channel DPCCH, TPC domain information of F-DPCH, information carried in a control channel, information carried in a custom channel, TPC domain information of certain downlink control information DCI in physical downlink control channel/enhanced-physical downlink control channel PDCCH/E-PDCCH, information of a carrier indication field CIF of PDCCH/E-PDCCH, or a radio network temporary identifier RNTI.

The receiving unit 53 is further adapted to receive the encoded ACK/NACK carried in the ACK/NACK resource. The ACK/NACK is encoded in PUCCH format 1a/1b, PUCCH format 1b with channel selection, or PUCCH format 3.

When downlink data corresponding to the ACK/NACK is transmitted in the LTE carrier, the ACK/NACK is encoded in PUCCH format 1a/1b, PUCCH format 1b with channel selection, or PUCCH format 3. When the downlink data corresponding to the ACK/NACK is transmitted in the UMTS carrier, the ACK/NACK is encoded in PUCCH format 3. The PUCCH format 3 is a reed-muller RM code or a dual-reed muller dual-RM code.

A system for feeding back ACK/NACK is also provided according to an embodiment of the application. Referring to a framework in FIG. 3, the system may include UE and a network node.

The UE is adapted to receive a high layer signaling, where the high layer signaling includes configuration information of an ACK/NACK resource; determine the ACK/NACK resource according to the high layer signaling; and feed back the ACK/NACK in the ACK/NACK resource.

The network node is adapted to allocate the ACK/NACK resource for the user equipment UE; transmit the high layer signaling including configuration information of the ACK/NACK resource to the UE, where the UE feeds back the ACK/NACK in the ACK/NACK resource, and receive the ACK/NACK fed beck by the UE through using the ACK/NACK resource.

It should be illustrated that specific description corresponding to some units, modules or devices, provided according to the embodiment of the application may refer to corresponding content in the first embodiment and the second embodiment, which will be omitted herein.

With the UE, the network node and the system for feeding back ACK/NACK according to the embodiments of the application, the network side allocates the ACK/NACK resource for the UE, and thus the UE may feed back the ACK/NACK in the ACK/NACK resource. In the conventional technology, when the UE supports downlink transmission of more than two networks and supports uplink transmission of only one network, the UE can only feed back ACK/NACK of downlink data which is sent via the network supporting the uplink transmission. Therefore, compared with the conventional technology, the UE may perform a feedback for downlink data sent via different networks, in the ACK/NACK resource allocated by the network side. In this way, the downlink data of different networks may be fed back correctly, and reliability for data transmission may be improved.

Through foregoing description of the embodiments, those persons of skill in the art may clearly understand that the present application may be implemented through software and necessary general hardware, or through the hardware, in most cases the former is preferable. In view of this, essence or part making contribution to the conventional technology of the technical solutions of the application may be implemented by software product. The computer software product is stored in a readable storage medium such as a computer floppy disk, a disk or a compact disk etc, and includes a plurality of instructions to enable a computer device (a personal computer, a server or a network device, etc) to implement the methods described according to the embodiments of the application.

Embodiments of the application are set forth, to which the scope of the application is not limited, some modifications or replacements within the technical scope disclosed by the embodiments of the application, which may be easily figured out by the persons of ordinary skill in the art, are within the protection scope of the claims. Hence, the scope of the application should be subjected to the scope of the claims.

What is claimed is:

1. A method for feeding back acknowledge/non-acknowledge (ACK/NACK), comprising:
receiving, by a user equipment (UE), configuration information of an ACK/NACK resource, wherein the configuration information is sent by a network node and is used to determine the ACK/NACK resource allocated by the network node, wherein the network node is in at least two different networks, and wherein the UE support downlink transmission in the at least two different networks, and supports uplink transmission in only one network of the at least two different networks;
determining, by the UE, the ACK/NACK resource according to the configuration information, wherein the ACK/NACK resource is a time frequency resource adapted to carry the ACK/NACK in an uplink channel; and
feeding back, by the UE, the ACK/NACK to the network node in the ACK/NACK resource, wherein the feeding back, by the UE, the ACK/NACK to the network node in the ACK/NACK resource comprises:

encoding, by the UE, ACK/NACK corresponding to downlink data received in a first carrier of a first radio access technology (RAT) and ACK/NACK corresponding to downlink data received in a second carrier of a second RAT different than the first RAT in a same format, wherein the first carrier is a long term evolution (LTE) carrier and the second carrier is any carrier other than the LTE carrier and wherein the same format is a physical uplink control channel (PUCCH) format 3; and feeding back, by the UE, the encoded ACK/NACK corresponding to downlink data received in the first carrier and the encoded ACK/NACK corresponding to downlink data received in the second carrier which are carried in the ACK/NACK resource, to the network node at the same time.

2. The method for feeding back ACK/NACK according to claim 1, wherein the determining, by the UE, the ACK/NACK resource according to the configuration information comprises:

determining, by the UE, at least one time frequency resource as a resource to be selected, from time frequency resources of the uplink channel, according to the configuration information; and acquiring, by the UE, an auxiliary indication; and determining, by the UE, the ACK/NACK resource from the resources to be selected, according to the auxiliary indication, wherein the auxiliary indication comprises one of:

a channel number of a high speed shared control channel (HS-SCCH), transmission power control (TPC) domain information of a dedicated physical control channel (DPCCH), TPC domain information of a fractional dedicated physical control channel (F-DPCH), information carried in a control channel, information carried in a custom channel, TPC domain information of certain downlink control information (DCI) in a physical downlink control channel/enhanced-physical downlink control channel (PDCCH/E-PDCCH), information of a carrier indication field (CIF) of the PDCCH/E-PDCCH, or a radio network temporary identifier (RNTI).

3. The method for feeding back ACK/NACK according to claim L wherein the PUCCH format 3 is a dual-reed muller code.

4. A user equipment (UE), comprising:

a receiver, adapted to receive configuration information of an acknowledge/non-acknowledge (ACK/NACK) resource, wherein the configuration information is sent by a network node and is used to determine the ACK/NACK resource allocated by a network node, wherein the network node is in at least two different networks, and wherein the UE support downlink transmission in the at least two different networks, and supports uplink transmission in only one network of the at least two different networks; and a processor, adapted to determine the ACK/NACK resource according to the configuration information, wherein the ACK/NACK resource is a time frequency resource adapted to carry the ACK/NACK in an uplink channel; and to feed back the ACK/NACK to the network node in the determined ACK/NACK resource, by:

encoding ACK/NACK corresponding to downlink data received in a first carrier of a first radio access technology (RAT) and ACK/NACK corresponding to downlink data received in a second carrier of a second RAT different than the first RAT in a same format, wherein the first carrier is a long term evolution (LTE) carrier and the second carrier is any carrier other than the LTE carrier and wherein the same format is a physical uplink control channel (PUCCH) format 3; and feeding back the encoded ACK/NACK corresponding to downlink data received in the first carrier and the encoded ACK/NACK corresponding to downlink data received in the second carrier which are carried in the determined ACK/NACK resource, to the network node at the same time.

5. The UE according to claim 4, wherein the processor is adapted to determine, from time frequency resources of the uplink channel, at least one time frequency resource as a resource to be selected, according to the configuration information; and acquire auxiliary indication; and determines the ACK/NACK resource from the resources to be selected, according to the auxiliary indication;

wherein the auxiliary indication comprises any one of a channel number of a high speed shared control channel (HS-SCCH), transmission power control (TPC) domain information of a dedicated physical control channel (DPCCH), TPC domain information of a fractional dedicated physical control channel (F-DPCH), information carried in a control channel, information carried in a custom channel, TPC domain information of certain downlink control information (DCI) in a physical downlink control channel/enhanced-physical downlink control channel (PDCCH/E-PDCCH), information of a carrier indication field (CIF) of the PDCCH/E-PDCCH, or a radio network temporary identifier (RNTI).

6. The UE according to claim 4, wherein the PUCCH format 3 is a dual-reed muller code.

7. A network node, comprising:

a processor, adapted to allocate an acknowledge/non-acknowledge (ACK/NACK) resource for a user equipment (UE), wherein the ACK/NACK resource is a time frequency resource adapted to carry ACK/NACK in an uplink channel;

a transmitter, adapted to transmit configuration information of the ACK/NACK resource to the UE, wherein the ACK/NACK resource is used for the UE to feed back the ACK/NACK to the network node in the ACK/NACK resource, wherein the configuration information is used to determine the ACK/NACK resource allocated by the network node, and wherein the network node is in at least two different networks, and wherein the UE support downlink transmission in the at least two different networks, and supports uplink transmission in only one network of the at least two different networks; and a receiver, adapted to receive the ACK/NACK fed back by the UE, in the ACK/NACK resource, wherein the ACK/NACK fed back to the network node in the ACK/NACK resource by the UE comprises:

ACK/NACK corresponding to downlink data received by the UE in a first carrier of a first radio access technology (RAT) and ACK/NACK corresponding to downlink data received by the UE in a second carrier of a second RAT different than the first RAT encoded in a same format, wherein the first carrier is a long term evolution (LTE) carrier and the second carrier is any carrier other than the LTE carrier and wherein the same format is a physical uplink control channel (PUCCH) format 3; and wherein the encoded ACK/NACK corresponding to downlink data received by the UE in the first carrier and the encoded ACK/NACK corresponding to downlink data received by the UE in the second carrier which are carried in the ACK/NACK resource, are fed back to the network node at the same time.

8. The network node according to claim 7, wherein the transmitter is adapted to transmit the configuration information to the UE, to enable the UE to determine at least one time frequency resource as a resource to be selected, from time frequency resources of the uplink channel; and transmit auxiliary indication to the UE, to enable the UE to determine the ACK/NACK resource from the resources to be selected;

wherein the auxiliary indication comprises one of a channel number of a high speed shared control channel (HS-SCCH), transmission power control (TPC) domain information of a dedicated physical control channel (DPCCH), TPC domain information of a fractional dedicated physical control channel (F-DPCH), information carried in a control channel, information carried in a custom channel, TPC domain information of certain downlink control information (DCI) in a physical downlink control channel/enhanced-physical downlink control channel (PDCCH/E-PDCCH), information of a carrier indication field (CIF) of the PDCCH/E-PDCCH, or a radio network temporary identifier (RNTI).

9. The network node according to claim 7, wherein the PUCCH format 3 is a dual-reed muller code.

* * * * *